No. 12,023. Reissued Aug. 19, 1902.

W. G. STONES.

FUEL FEEDING APPARATUS.

(Application filed Mar. 29, 1902.)

3 Sheets—Sheet 1.

WITNESSES:

Geo. M. Aldom

Adelaide Claire Gleason.

INVENTOR

William Grimshaw Stones

BY Richards & Co.

ATTORNEYS.

No. 12,023. Reissued Aug. 19, 1902.
W. G. STONES.
FUEL FEEDING APPARATUS.
(Application filed Mar. 29, 1902.)
3 Sheets—Sheet-2.
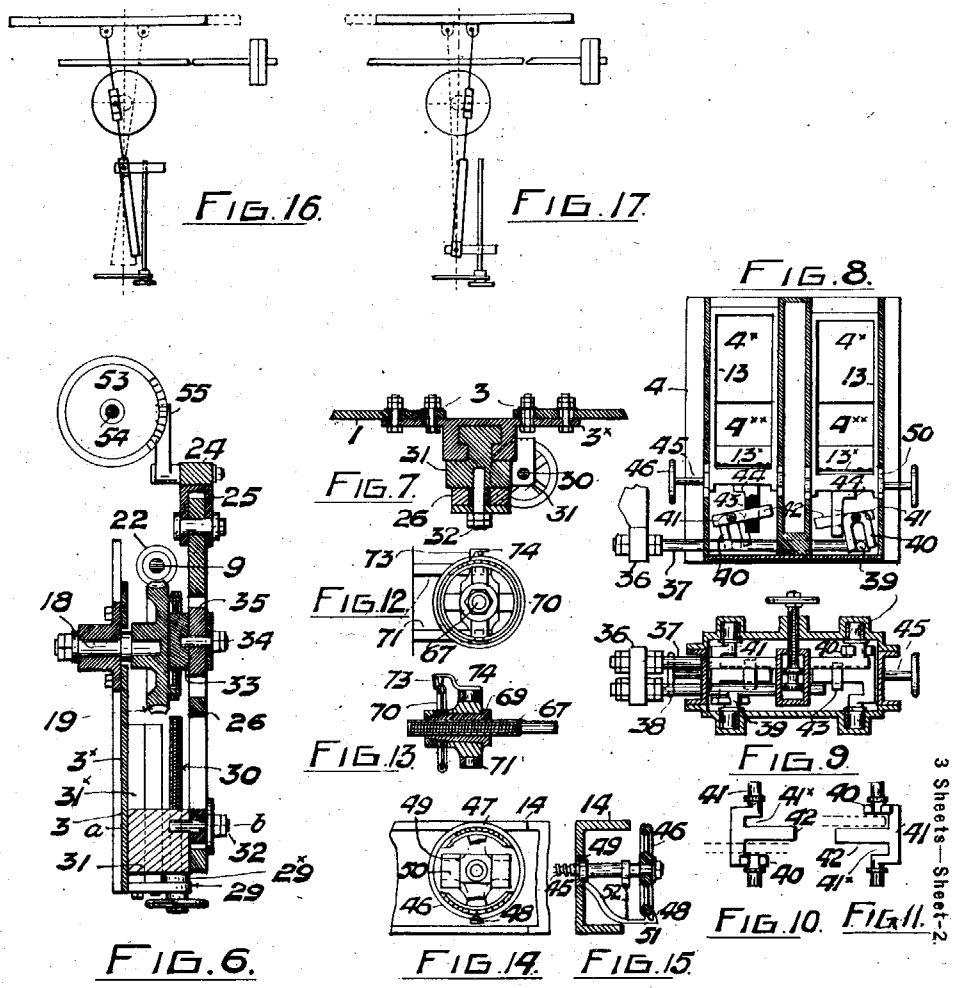
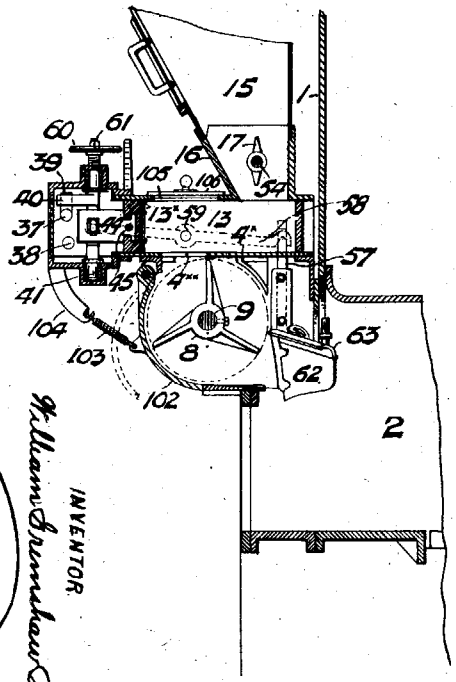
INVENTOR.
William Grimshaw Stones
R. Richardson
ATTORNEYS.
WITNESSES:
Chas. W. Addom
Adelaide Claire Gleason.

No. 12,023. Reissued Aug. 19, 1902.

W. G. STONES.

FUEL FEEDING APPARATUS.

(Application filed Mar. 29, 1902.)

3 Sheets—Sheet 3.

INVENTOR.

William Grimshaw Stones

BY

ATTORNEYS.

WITNESSES:

Chas. W. Aldom

Adelaide Blaine Gleason.

UNITED STATES PATENT OFFICE.

WILLIAM GRIMSHAW STONES, OF BLACKBURN, ENGLAND, ASSIGNOR TO SMOKE PREVENTER COMPANY, LIMITED, OF BLACKBURN, ENGLAND.

FUEL-FEEDING APPARATUS.

SPECIFICATION forming part of Reissued Letters Patent No. 12,023, dated August 19, 1902.

Original No. 680,818, dated August 20, 1901. Application for reissue filed March 29, 1902. Serial No. 100,631.

*To all whom it may concern:*

Be it known that I, WILLIAM GRIMSHAW STONES, a subject of the King of Great Britain and Ireland, and a resident of Preston New Road, Blackburn, in the county of Lancaster, England, have invented certain new Improvements in or Relating to Fuel-Feeding Apparatus, of which the following is a specification.

My said invention relates to apparatus for supplying fuel to steam-boiler and other furnaces for the economical raising of steam and prevention or consumption of smoke. The said apparatus is characterized, first, by one, two, or more slides or feed-boxes acting in a to-and-fro direction at right angles to the boiler-front under the impulses of a variable lever-motion, said boxes provided with means for regulating and indicating their action, receiving fuel from a hopper above, and delivering it to fans beneath for projection into the furnace; secondly, by special arrangements and forms of plates for distributing the fuel onto various parts of the furnace-grate and means for regulating and indicating the position of such plates, and, lastly, by the complete apparatus being under complete control, easy of repair, and its several parts allowing of expansion and contraction without affecting their efficiency.

I will now describe my invention in detail, reference being had to the accompanying drawings, which illustrate its application to a two-flued (Lancashire) boiler.

Like numerals indicate like parts in the several views.

Figure 1:
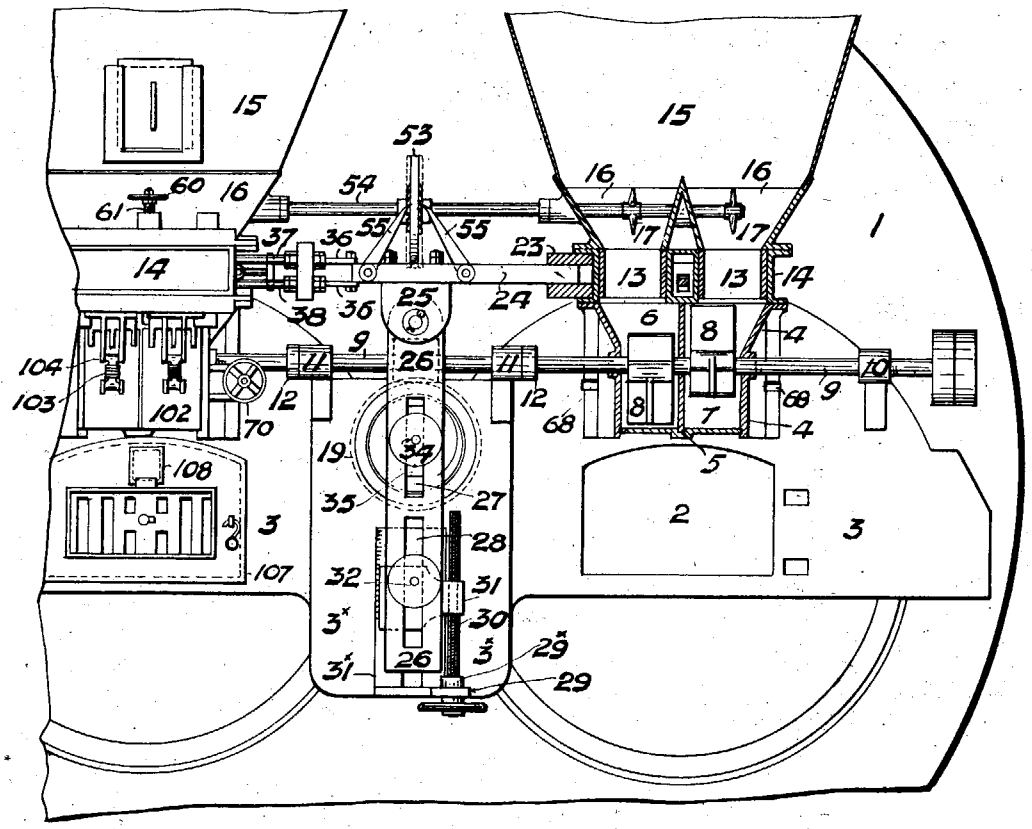
Figure 3:
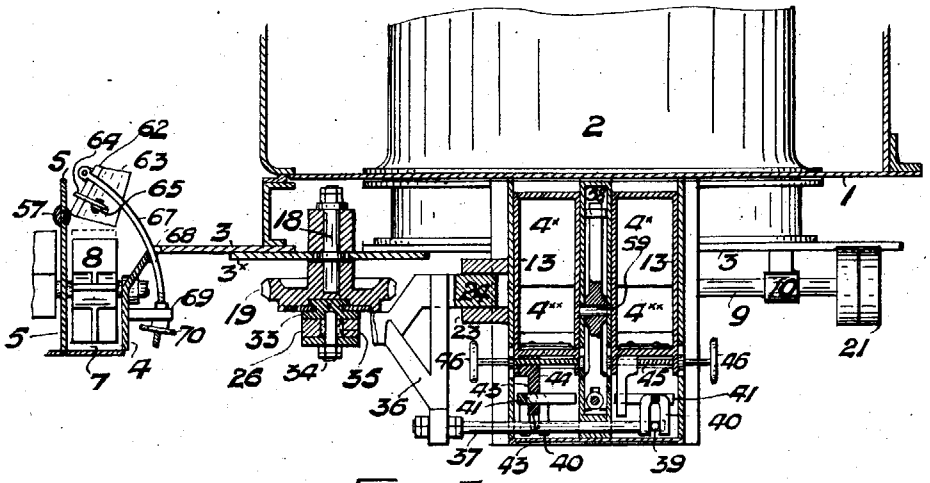
Figure 5:
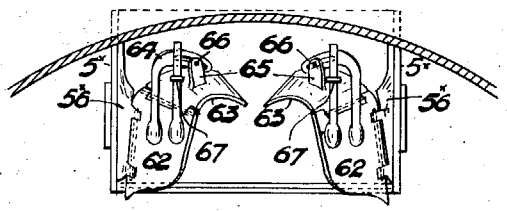
Figure 4:
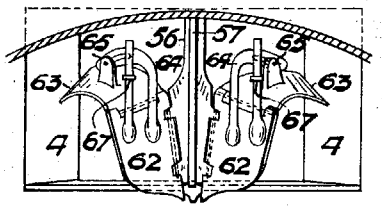

Figure 1 represents so much of a boiler-front as is necessary to demonstrate the application of my improved stoker and regulating apparatus thereto, the stoker-fittings for the right-hand flue being in section and the stoker-fittings for the left-hand flue (so much as is shown) being in elevation. Fig. 2 represents a longitudinal section through one furnace and its corresponding fan-casing and fuel-feed box. Fig. 3 represents a sectional plan of the stoker, taken through one set of the fuel-feed boxes and through a portion of the fan-casing below the other set. Fig. 4 represents, to an enlarged, scale an arrangement of inclined articulated distributing-plates as seen from the inside of the furnace. Fig. 5 represents a similar view of another arrangement of the said inclined articulated distributing-plates. Fig. 6 represents a vertical section through the variable lever-motion. Fig. 7 represents a horizontal section through the variable lever-motion on line *a b*. Fig. 8 represents another plan of the fuel-feed boxes and their operating mechanism, but in a different position from that shown in Fig. 3. Fig. 9 represents the slide-box casing in section and exposing a front view of the operating mechanism of the fuel-feed boxes and the hand-wheel and screw for raising and lowering the inclined articulated distributing-plates shown in Figs. 2, 3, and 4. Figs. 10 and 11 represent detached parts of the fuel-feed-box-operating mechanism. Figs. 12 and 13 represent, respectively, a front elevation and longitudinal section, to an enlarged scale, of the adjusting and registering device for the angular setting of the distributing-plates shown in Figs. 4 and 5. Figs. 14 and 15 represent, respectively, an elevation and section, to an enlarged scale, of the adjusting and registering device for setting the traverse of the fuel-feed boxes. Figs. 16 and 17 represent in diagram two positions under the same degree of impulse of the variable lever-motion.

Referring to the adaptation of my invention to a two-flued boiler in particular, 1 is the boiler-front, and 2 the furnaces. Upon the front of each furnace and upon the boiler-shell I mount base-plate 3 or one plate only common to both furnaces; but two are preferred for the better fixing of the plates and to allow of expansion and contraction. Upon each base-plate I mount a fan-box 4, divided by vertical plate 5 into two compartments 6 and 7. In such compartments are the fans 8, with by preference three arms or beaters (see Fig. 2) keyed upon the driving-shaft 9, which passes through the box and is carried by bearings 10 and 11, retained by collars 12. Above and resting upon each fan-box 4 are the slides or feed-boxes 13, inclosed by frame or walls 14 and capable of working in a to-and-fro direction at right angles to the boiler-front. Above each frame 14 is a hopper 15, with two or more outlet-throats 16 and designed to contain the supply of fuel to be delivered into the furnace. In each throat of said hopper is a rotary agitator 17 for causing the fuel to descend uniformly into the slide-boxes 13 and prevent choking.

Upon the base-plates 3 or by preference upon a separate base-plate $3^{\times}$ I mount a stud or axle 18, and upon such stud I mount the worm-wheel 19. (See Figs. 1, 3, and 6.) Over said wheel I mount the driving-shaft 9, which passes through the fan-boxes, as aforesaid, and is fitted at one end with any suitable form of driving means—as, for instance, the fast and loose driving-pulleys at 21. Such shaft at a point immediately above the worm-wheel 19 is also fitted with the worm 22, which gears with the worm-wheel 19 and when the shaft is in motion drives the worm-wheel. Above the said worm and worm-wheel gearing and supported at each end in sockets 23, formed in or on the sides of the frame 14, I arrange a bar or rod 24, capable of a to-and-fro endwise traverse. From such rod or bar I suspend a bracket or fork 25, and from a pin on such fork I suspend the lever 26, which I thereby cause to lie immediately in front of the worm-wheel 19. Such lever is provided with a continuous slot or by preference two slots 27 and 28. Passing through a bracket 29 at the lower end of said lever I provide a screw 30, working in a threaded sliding block 31, carrying a pin 32, which forms the fulcrum or approximate center upon which the lever 26 moves. Upon the face of the worm-wheel 19 is an adjustable block 33, (see Fig. 6,) carrying or formed with a stud 34, which projects through the slot 27 of lever 26 and carries an oscillatory slide-block 35, which works in the upper slot 27. The screw 30 only rotates and does not rise and fall in adjusting the fulcrum-pin 32. With the worm-wheel in motion the eccentricity of the stud 34 imparts a rocking movement to the lever 26, which thereby imparts a to-and-fro motion to the bar or rod 24. Upon the bar or rod 24 is a set of brackets 36, and carried at the extremity of each of said brackets are rods 37 and 38, one above the other and both passing through the wall or frame 14. Upon each rod within the box is a snug or projection 39, which engages with a fork 40 on the vertically-mounted crank or swivel 41, (see Figs. 2, 3, 8, 9, 10, and 11,) identified with a finger 42, which engages with the slotted extension 43 of nut 44 on screw 45, operated by hand-wheel 46, mounted upon the end of feed-box or slide 13. When the bar 24 is operated as aforesaid, the brackets 36 cause the rods 37 38 to move to and fro, which then by snugs 39, operating upon the forks 40, impart a reciprocating motion to the swivels 41 and cause the fingers 42 to move the feed-boxes 13 toward and away from the boiler-front. By the rotation of screws 45 the movements of each slide can be independently adjusted to a nicety or stopped entirely, due to the traverse of the nut 44 toward the neutral center of the swivels, which is allowed by the peculiar cranking of the swivel at $41^{\times}$. (See Figs. 9, 10, and 11.) To enable the adjustment of the screws 45 to be intelligently determined, I provide an index 47 on each hand-wheel 46 and a pointer 48 for each index, carried by a block 49, sliding in slot 50 in the frame 14 along with the feed-boxes 13. Said pointer carries a detent 51, held into indents in the periphery of wheel 46 by spring 52.

In the operation of the slides as aforesaid it will be seen that a short pulsating action is imparted thereto, and I will now describe the manner in which such action is utilized to feed the fuel to the fans 8 and by them to the furnace. The two throats of the hopper 15 lie over the space surrounded by the rear parts of the slide-boxes 13 and over the plate $4^{\times}$, as shown in Fig. 2, and consequently the fuel from the hopper falls onto such plate. The slides 13 consist of frames of metal open top and bottom, and the end nearest the boiler lies at all times beyond the throat of the hopper. In the front part of plate $4^{\times}$ is the opening $4^{\times\times}$, the edge of which nearest the boiler lies directly over the axis of the fans. Hence as the fuel falls onto the plate $4^{\times}$ it also falls within the walls of the slide, which when set in motion, as aforesaid, moves the fuel forward intermittently or step by step and precipitates it through the opening $4^{\times\times}$ into the fan-box, where it is caught by the rapidly-rotating fans and projected into the furnace.

To allow for the proper working of the slide-boxes 13, I provide each one with a strip of felt $13^{\times}$, (see Figs. 2 and 3,) adapted to absorb a supply of oil or grease and at each stroke lubricate the box. Such felt is also useful in keeping coal-dust away from the slide-box-operating mechanism. The floor of the part containing the swivels 41 forms a well in which oil or other suitable lubricant may lie and serve to lubricate the swivels.

To maintain an even and constant feed and to prevent choking, I mount a face ratchet-wheel 53 upon the shaft 54, and upon the bar 24 I mount a set of pawls 55, engaging, respectively, with the opposite faces of the wheel 53 at each stroke of the bar 24, imparting a fraction of a turn to said wheel, its shaft, and the agitators 17. Each fan-box 4 being, as aforesaid, divided by vertical division-plate 5, the streams of fuel have separate outlets.

In Figs. 2, 3, and 4 I show the arrangement of plates I employ for distributing the fuel to the various parts of the furnace, which consists of a bracket 56, working in slot 57 in plate 5 and suspended from the rear end of lever 58, pivoted at 59, as shown in Figs. 2 and 3, under control of screw 61 and hand-wheel 60. Upon two edges of such bracket, which are arranged at upwardly-diverging angles, (shown more clearly in Fig. 4,) I hinge a set of plates 62, capable of moving through an arc of a circle of about forty-five degrees. To the top edge of each plate 62 I hinge another plate 63, also capable of moving through an arc of a circle of about forty-five degrees. The plates 62 are by preference flat; but the plates 63 are curved or arched, and their normal relative positions are shown in Figs. 2 and 4. To maintain or vary such positions, the plates 62 carry on their rear faces a slotted arm 64 and the plates 63 a snug 65 and set-screw 66, which latter, passing through the snug and slotted arm and being tightened up, effects the desired relative setting of the plates. The lower edge of each plate 62 is on the slope and slightly curved, with the corner rounded off, as shown, which is a highly-important feature in the working of the plates, as the fuel is thereby more evenly distributed upon the grate than if the plates were rectangular.

To effect the adjustment of the plates from the exterior of the furnace, I provide a link or rod 67 for each plate 62, passing through opening 68 in the base-plate 3, coupled to the rear face of plate 62 at one end and at the other end passing through the screwed boss 69, carrying hand-wheel 70, supported by bracket 71. By rotating the hand-wheel 70 the rod or link 67, which is screw-threaded where it passes through the boss 69, is traversed in or out, and consequently the plates 62 are moved on their hinges.

To facilitate the setting of the plates, I provide the rim of hand-wheel 70 with an index 72 and a fixed pointer 73, and to maintain them in any position I provide a detent-spring 74. (See Figs. 12 and 13.)

By mounting the distributing-plates upon adjustable bracket 56, suspended, in turn, by lever 58, I permit of their being raised *en bloc* and caused to leave a clear path for the stream of fuel issuing at the lower part of the outlet and to only act upon the upper part of the stream, or, in other words, allow part of the fuel to fall on that portion of the fire directly opposite the outlet and the remaining part to be directed onto the sides.

According to a modification I may mount the distributing-plates at the outside edges of the fuel-outlets, as shown in Fig. 5, causing their working sides to face each other and direct the fuel issuing from the left-hand outlet to the right-hand side of the furnace and the fuel issuing from the right-hand outlet to the left-hand side of the furnace, one plate being idle while the other is in action. In this modification the sides of the outlets are square to the shaft 9.

In the case of the plates being mounted in the manner shown in Fig. 5 there is a separate bracket 56× for each set of plates adjustably mounted in parts 5×, and each bracket is separately adjusted by independent levers 58 or by one lever common to both brackets and hand-wheel or hand-wheels to suit.

Although I prefer the brackets 56 or 56× to be adjustable, as aforesaid, they may be fixed.

In starting the apparatus motion is imparted to the shaft 9 through the pulley 21. The slide-block 31 is then (or previously) adjusted in slot 28 until the desired rocking movement is obtained, which may vary according to the supply of fuel desired or rate of feed. The screws 45 are then (or previously) rotated to give the required stroke of the fuel-feed boxes 13.

I apply a collar or equivalent device to the screw 30 above the bracket 29 to prevent the end traverse of the screw through such bracket, as shown at 29×, Fig. 1.

While I have described my invention as applied for simultaneously feeding two furnaces, I may utilize separate apparatus for each furnace, and although I describe two fuel-boxes and two fans for each furnace there may be one fuel-box only or one fan to two feed-boxes or more fans or more feed-boxes.

While I prefer a slotted lever or bar, I may arrange the oscillatory block and fulcrum-block to slide upon a solid rod or bar, and for the proper fixing or mounting of the parts or for obtaining like movements and effects the details of my invention may be varied without departing from the principle thereof.

To prevent the fan-boxes getting choked, I provide the hinged door 102, held in position in ordinary working by spring 108, supported by bracket 104 or by a weight.

An important advantage arising from the construction of that part of the casing containing the fuel-boxes is that it permits of an opening being formed at 105 for the inspection of the boxes or for giving access thereto for removal of any obstruction. Such opening is provided with lid 106. For inspection of the firing the furnace-door 107 is provided with the opening or "inspection-eye" 108. To provide for the better distribution of the fuel, the sides of the fan-box outlets may be sloped, and the parts of the casing beneath the boxes may also be sloped, as shown in Figs. 1 and 3.

Having thus particularly described and ascertained the nature of my said invention and in what manner the same is to be performed, I declare that what I claim is—

1. In steam-generator and other furnaces, the combination therewith of one or more slides, or fuel-feed boxes, working at right angles to the boiler-front; a fan-box and fan, or fans, beneath said slides; a fuel-feed hopper above said fan-box and slide or slides; a bed or base plate carrying said fan-box and hopper; a rocking lever with variable fulcrum; means for imparting the motion of said lever to the said slides and controlling the movements of said slide or slides; inclined articulated fuel-distributing plates, a supporting-bracket therefor and means for adjusting and indicating the position of such plates and supporting-bracket, as set forth.

2. In steam-generator and other furnaces, the combination of one or more slide-boxes;

a screw upon the end of each box; a nut on said screw with finger or extension formed with an opening, a "swivel" or crank with fork engaging with said finger; a rod with pin engaging with fork on said swivel; a bracket carrying said rod; a cross-bar carrying said bracket; a lever suspended from said cross-bar; a fulcrum engaging with said lever; an adjustable bracket or block carrying said fulcrum; a screw for adjusting said block; an eccentrically-mounted block engaging with the upper portion of said lever; a wheel carrying said block and driven by any suitable means, as set forth.

3. In steam-generator and other furnaces, the combination of a supporting-bracket; a distributing-plate hinged at an angle thereto; a further distributing-plate hinged to the top edge of said plate, and means for maintaining said plates in proper relation to each other, as set forth.

4. In combination, a supporting bracket or brackets, two sets of inclined articulated distributing-plates; a lever or levers for supporting said bracket, or brackets, and plates; means for effecting the adjustment of said lever or levers; a set of links or rods connected with said plates, a screwed boss through which each of said rods passes; a support or bracket for carrying said boss; and a hand-wheel for operating said boss with index and pointer, as set forth.

5. In combination, the fuel-box and slide, a rocking lever connected to the slide; a fulcrum engaging said lever; a block carrying said fulcrum; a screw for adjusting said block; a worm-wheel; a pin or stud eccentrically mounted upon the worm-wheel engaging the upper portion of said lever; a worm gearing with said worm-wheel; a shaft carrying said worm; and means for driving the said shaft.

6. In combination, a cross-bar, a rocking lever, a fulcrum engaging with said lever, a sliding block carrying said fulcrum, a screw for adjusting said block, a bracket through which said screw passes, a collar for preventing said screw traveling, as set forth.

7. In combination, a cross-bar, a pawl or pawls upon said cross-bar; a shaft above said pawls; a face ratchet-wheel upon said shaft; a set of feed-hoppers, and a set of agitators on the said shaft situated in the throats of the feed-hoppers, as set forth.

8. In combination, a set of bed-plates and fan-boxes, one plate for each fan-box, and one for supporting the gearing mechanism, so arranged as to allow for their independent expansion or contraction, as set forth.

9. In combination, a fan-casing with tapered sides, a vertical partition for dividing the said fan-casing, a frame upon the said casing with an opening for inspection of the feed, a lid or cover for the said opening, a relief-door in the fan-casing, a fixed bracket and spring for holding the said door normally closed, and a casing for containing slide-box-operating mechanism, as set forth.

10. The herein-described center motion comprising a lever, a rising-and-falling fulcrum therefor with means for adjusting the same, worm-gearing and an eccentric pin for connecting the worm-gearing with the lever, substantially as described.

In witness whereof I have hereunto set my hand in the presence of two witnesses.

WILLIAM GRIMSHAW STONES.

Witnesses:

WALTER GUNN,
JOHN CAMP.